Sept. 17, 1968   J. G. SAVINS   3,401,990
SEALED LUBRICATION SYSTEM
Filed Sept. 14, 1966

INVENTOR.
Joseph G. Savins

United States Patent Office 3,401,990
Patented Sept. 17, 1968

3,401,990
SEALED LUBRICATION SYSTEM
Joseph G. Savins, Dallas, Tex., assignor to Mobil Oil Corporation, a corporation of New York
Filed Sept. 14, 1966, Ser. No. 579,378
11 Claims. (Cl. 308—36.3)

ABSTRACT OF THE DISCLOSURE

A sealed lubrication system having a lubricated rotatable shaft supported by bearing and having a parallel plate arrangement at each end of the shaft comprising a rotatable plate and a fixed plate with a gap therebetween, with a shear-thickening viscoelastic liquid in the gap forming a liquid seal during rotation of the shaft.

---

This invention relates to a lubrication and sealing system for lubricating and minimizing or preventing leakage of fluids from various structures, such as lubricated shafts, bearings, and the like.

According to the invention, the structure to be lubricated, which in the usual case comprises a rotatable shaft supported in a bearing or housing, is provided at both end portions thereof with a parallel plate arrangement comprising a plate fixed to the shaft and rotatable therewith and, slightly spaced therefrom, a stationary plate. Preferably the rotatable plate is disposed adjacent the housing and the stationary plate is spaced outwardly thereof. Both plates of each arrangement are substantially flat and substantially parallel to each other, are coaxially disposed, are preferably circular, and together define a narrow gap. A rheologically complex, shear-thickening, viscoelastic liquid is present in each gap during rotation of the shaft and provides three effects: it acts to lubricate the shaft surfaces; it feeds liquid to the said surfaces by virtue of exhibiting a normal stress or normal force effect, as will be described; and it serves to prevent leakage of liquid from the gaps by virtue of exhibiting a shear-thickening effect. The last two effects are brought about by placing the liquid in a state of shear; thus, upon rotation of hte shaft, and therefore of the rotatable plate, a tangential or rotational stress is applied to the liquid in each gap, and it then undergoes tangential shear; in turn, a normal stress effect is generated in the liquid which is effective to feed liquid to the surfaces to be lubricated; and as the rate of shear of the liquid exceeds a threshold or critical shear rate, hereinafter described, the liquid undergoes thickening in the gaps to provide a sealing action.

The invention may be better understood by referring to the accompanying drawing in which a selected embodiment is illustrated and in which FIG. 1 comprises a broken, central longitudinal sectional view of a bearing-supported shaft disposed in a housing;

Figure 1:
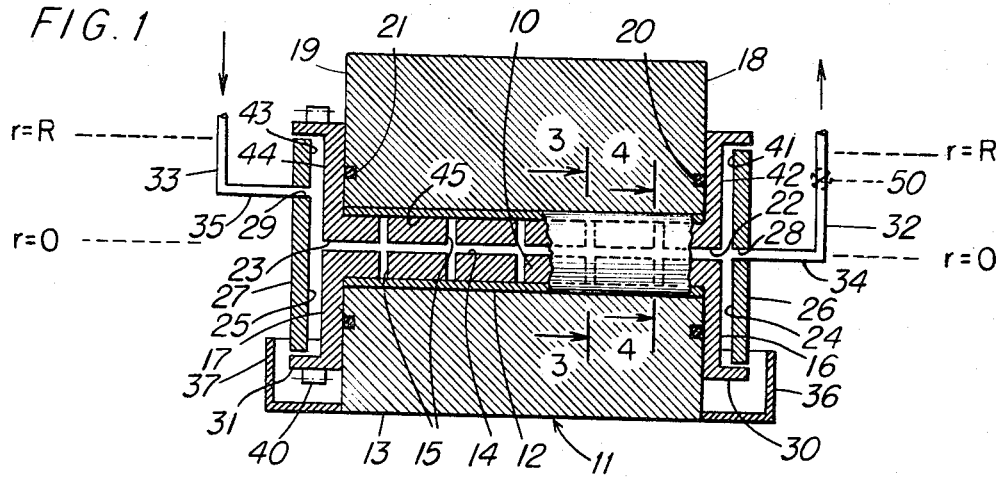
Figure 3:
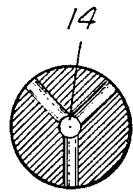
FIG. 3 is a cross-sectional view of a portion of the construction of FIG. 1 along the line 3—3 thereof.
Figure 4:
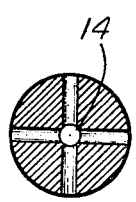
FIG. 4 is a view like FIG. 3 but taken along line 4—4.

As shown in FIG. 1, the system or device comprises a rotatable shaft 10 disposed in a housing 11 which suitably comprises a bearing 12 of bronze or other bearing material mounted in a metal block 13. The shaft has a central longitudinal bore 14 extending through it, from which there extend radially thereof a plurality of longitudinally spaced radial bores or passages 15 each of which extends through the cylindrical surfaces of the shaft. Looking at FIG. 3, the number of such passages at this cross section may be three; or as shown in FIG. 4, it may be four; or it may be two or five or more, depending on anticipated bearing load, the clearance (note 45) between the shaft 10 and the bearing 12, and possibly other considerations. These various considerations are understood in the art and do not form a part of the invention. Also, and looking at FIG. 1, the passages 15 need not necessarily be disposed at a right angle to bore 14, as shown, but may be positioned at an angle less than 90°.

Plates 16 and 17 are fixedly mounted on the shaft 10, by means not shown, closely adjacent to end faces 18 and 19 of the housing. Liquid-tight seals are provided at 20, 21. The plates are rotatable with the shaft and have central bores 22, 23 aligned with the shaft bore 14. Spaced outwardly of the plates, and separated therefrom by a narrow gap 24, 25, are fixed plates 26, 27, suitably supported by means not shown. Plate 26 has a central bore 28 aligned with shaft bore 14; while plate 27 has a bore 29 intermediate its center and its periphery, i.e., if R is the radius $r$ of the plate, the bore is intermediate $r=0$ and $r=R$. The fixed plates are disposed within an annular flange 30, 31 which is fixed to the rotatable plates. One of these flanges, for example, flange 31, may have suitable means such as the external gear teeth 40, through which the shaft 10 may be rotated. Conduits 32, 33 have sections 34, 35 which extend into the bores 28, 29. Conduit 33 comprises inlet means for admitting liquid into gap 25 while conduit 32 comprises outlet means for removing liquid from gap 24. Conduit 33 connects to a suitable tank, not shown, for holding liquid, while conduit 32 may return liquid to such tank.

Each pair of gap-separated end plates 16, 26 and 17, 27 comprises a parallel plate arrangement, with the plates of each pair being of generally coextensive size. Gaps 24, 25 are shown exaggerated in size although actually they may be quite narrow. Their exact dimensions will depend on various factors of equipment size, shaft operating speed, the liquid to be used therein, etc., and thus cannot well be stated in numerical terms to apply to all variations; however, in order to illustrate the invention, it may be stated that the gap size can be of the order of conventional engineering tolerances and can range to larger values, going up to 1 or more millimeters.

The lower portions of each pair of plates extend into the reservoirs 36, 37, which serve to catch any spill over prior to steady state working of the system.

Figure 2:
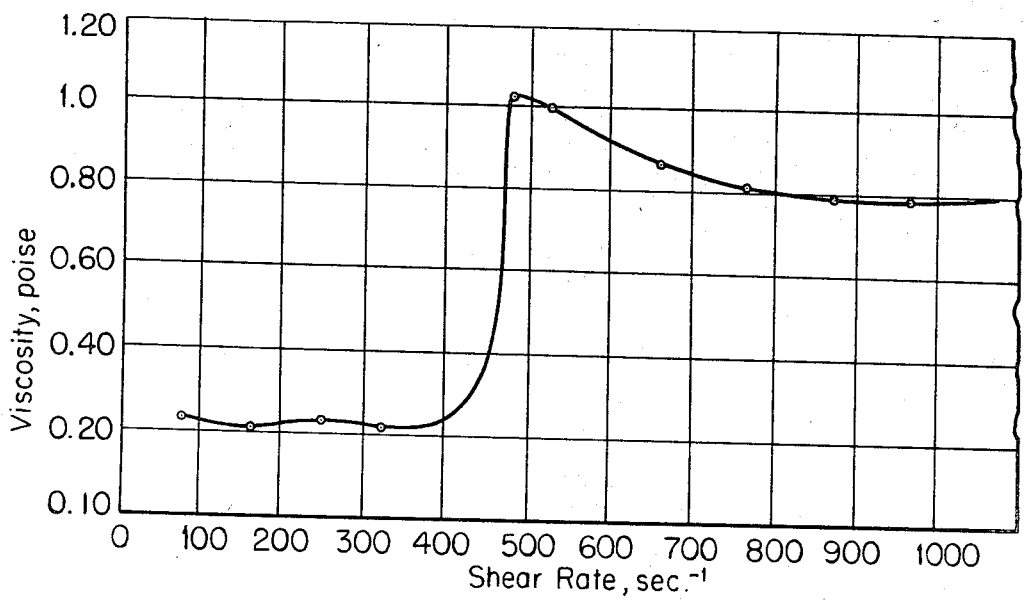
FIG. 2 is a graph showing the variation of viscosity with shear rate of an illustrative liquid.

Referring to FIG. 2, this illustrates shear-dependent viscosity behavior of a shear-thickening liquid and may provide some insight into the viscous behavior of liquids contemplated as useful for the invention. The figure shows the relation between the viscosity in poises and the shear rate in reciprocal seconds over a shear rate ranging from less than 100 to more than 1000 reciprocal seconds (r.s.) for a specific liquid, namely, a mixture comprising 1.13% by weight of polyvinyl alcohol, 4.49% by weight of sodium borate, balance water, known commercially as "Lemol 42/88," a product of Borden Chemical Company. This is a rheologically complex liquid belonging to the category of shear-thickening liquids. This liquid additionally exhibits normal stress or normal force behavior. A shear-thickening liquid is designated as one for which viscous resistance (viscosity) increases with increasing rate of deformation (shear rate). A viscoelastic liquid is one which exhibits both viscous and elastic behavior, displaying normal stress effects. As is apparent from FIG. 2, the viscosity or flow resistance of the liquid is reasonably constant, e.g., a value of about 0.22 poise is obtained over a shear rate ranging from about 80 to more than 400 r.s. At a shear rate of about 475 r.s., designated the critical or threshold shear rate, the viscosity increases sharply, i.e., the liquid thickens. Above 475 r.s. the viscosity remains high, although it decreases from a peak of about 1.02 to about 0.80 as the shear rate increases to about 1080 r.s. It will be noted that the increase of viscosity at the threshold shear rate is represented by the ratio, 1.02:0.22, which is nearly fivefold and which represents an order-of-magnitude change. Compared to the applied tangential stress at an equivalent shear rate, the resulting normal stress in fluids of this type is often larger by an order of magnitude.

According to the invention, the liquid of FIG. 2 is suitable for use in the gaps 24, 25 of FIG. 1.

There may now be described two methods of operation, one of which provides for a continuous feeding or movement of liquid from the said storage tank, through the system, and back to the tank; and the other of which provides for shutting off the inlet and outlet flows to and from the system. In both methods, lubrication of the system and the avoidance of leakage are provided. Essentially, the second method employs a higher shaft speed, and thus a higher shear rate than the first.

In the first method of operation the shear-thickening viscoelastic liquid is introduced to gap 25 through inlet conduit 33 via entry bore 29. Simultaneously, shaft 10 and plates 16 and 17 fixed thereto are rotating, the angular velocity being maintained at a level such that the shear rate in peripheral portions of the shear gap 25 is equal to a critical threshold shear rate characteristic of the liquid. As noted previously, a characteristic of a viscoelastic liquid is that under shear, normal stresses are generated. These normal stresses are often 20, 30, or even 40 times or more greater than the corresponding applied tangential stresses when compared at equal shear rates. The normal stresses act as circumferential or hoop stresses which tend to "strangulate" the liquid in the gap; for example, in gap 25 the liquid is thus forced from the circumferential region around entry bore 29 towards the center of plate 27 (where $r=0$) and thence into bore 23 in rotating plate 17. At the point or portion where $r=0$, the hydrostatic pressure is greatest, i.e., it is above the external hydrostatic pressure. By virtue of this imbalance, liquid is forced into shaft bore 14, thence radially into passages 15, and then into annular clearance 45. In this way the liquid flows to the opposite end of the shaft, some of it travelling in clearance 45 and some in bore 14, and at such opposite end it exits into gap 24, the liquid in clearance 45 finding its way into gap 24 through one or more passages 15 and bores 14 and 22. From gap 24 the liquid enters conduits 34 and 32 and may travel back to the supply source, not shown.

As noted previously, a characteristic of a shear thickening liquid is that viscous resistance increases when the rate of shear developed in the liquid exceeds a threshold shear rate characteristics of the liquid. By maintaining the more passages 15 and bores 14 and 22. From gap 24 the shear rate in peripheral portions of shear gap 25 equal to the threshold shear rate, two results are noteworthy. First, the thickening action which develops in the form of an annular ring provides a sealing action in peripheral portions of the gap; this eliminates leakage of fluid through the gap periphery. At steady state conditions, a similar ring will also develop in gap 24. Secondly, by confining the thickening action to peripheral portions of the gap, there will be no impedance to the flow of liquid through bore 29 into gap 25, since at the position of bore 29 relatively to the said peripheral portions, the liquid is not thickened. In this connection it is to be noted that in the parallel plate geometry embodied in the design of plate pairs 16 and 26, and 17 and 27, respectively, the shear rate increases with increasing radial distance, as measured from the axial center of the gap defined by each pair of plates to the periphery thereof. Thus, shear thickening is confined to the peripheral regions of each gap, providing sealing action; while unthickened fluid is forced by the normal stress effect into the gap 25 from entry bore 29, and out of gap 24 into outlet bore 28.

In the second method of operation, which is useful in certain applications, the assembly is initially filled with the shear-thickening viscoelastic liquid. Thus, on achieving fill-up, one then increases the angular velocity of the shaft to such an extent as to raise the shear rate of the liquid in the gaps to a point where the threshold shear rate, considering gap 25, now occurs at the radial position where bore 29 is located. Under these conditions, leakage is controlled and sealing is achieved from the peripheral regions of gap 25 radially inwardly to and including such radial position of the bore 29. The thickened condition of the liquid which results at the bore 29 impedes the flow of liquid so that entry conduit 35 is effectively "valved off." With outlet bore 28 located at $r=0$, as shown in the figure, a valve 50 is provided in outlet pipe 32, being shown in broken lines to indicate its optional character, depending on whether said first or second method is in use. By closing this valve, one prevents the flow of unthickened liquid in both gaps. Thus, in gap 25 the unthickened liquid between the radial position corresponding to bore 29 and the radial position corresponding to $r=0$ is prevented from flowing into bore 14; and in gap 24 the unthickened liquid between the radial position which corresponds to bore 29 in the opposite gap and the radial position corresponding to $r=0$ is prevented from being pumped out into conduit 34.

It will be apparent that the second method may be changed to the first by reducing the shaft speed and opening valve 50.

In a variation of the second method, valve 50 can be dispensed with if outlet bore 28 is moved radially outwardly so that its radial distance from $r=0$ is the same as that of bore 29. In these circumstances, a valving effect occurs similar to that just described, whereby the flow into bore 28 is shut off, thereby eliminating the need for a mechanical valve.

Flanges 30 and 31 on the rotatable plates help to retain the liquid in the gaps. Any spill over is caught in the reservoirs 36 and 37 and may be reused.

Turning again to the liquids, another specific example is a mixture comprising 1.31% polyvinyl alcohol, 4.48% sodium borate, and the balance water, weight basis. This mixture exhibits a gradually increasing apparent viscosity of 12 to 18 poises as the shear rate increases from 0 to 15 r.s.; the viscosity then rises rapidly to 30 poises as the shear rate reaches 20 r.s.; between 20 and 22.5 r.s. the threshold value is reached and exceeded, and the viscosity jumps to a value above 60 poises. With this type of liquid present in a device which is correlated thereto, the viscosity begins to increase as the shear rate begins to increase, this being in some contrast to the liquid of FIG. 1 where the viscosity is substantially constant with increasing shear rate until the threshold value is reached; however, since there is a jump in viscosity at the threshold rate, shear thickening takes place.

Another type of liquid may exhibit, below the threshold value, a gradually decreasing viscosity with increasing shear rate, followed by a jump in viscosity as the threshold value is exceeded. An example of this type is a mixture comprising, weight basis, 1.62% polyvinyl alcohol 65/98, 0.073% sodium borate, and the balance water. This mixture exhibits a gradually decreasing apparent viscosity, ranging from 0.17 to 0.13 poise, as the shear rate increases from 0 to 480 r.s. Beyond the threshold value, which occurs at approximately 450 r.s., the viscosity increases sharply from 0.14 poise at 500 r.s. to 0.35 poise at 1200 r.s.

Other examples of suitable liquids are aqueous solutions of polymethacrylates and poly(alkyl methacrylates), preferably containing at least 9% by weight of the polymer; an aqueous solution of gum arabic and borate ions; and aqueous solution of guar gum and borate ions, etc. Non-aqueous compositions are suitable, including a 25% dispersion of calcium stearate in mineral oil; and a polyvinyl alcohol-borate complex in ethylene glycol.

Still other useful shear-thickening viscoelastic materials may be found in the literature.

It is to be understood that the characteristics of the device and of the liquid to be used therein will be correlated to each other to assure that sufficient normal stress behavior will be provided, and that when the threshold shear rate of the liquid is exceeded, sufficient shear thickening will be produced as to be effective for the described purpose; and also to assure that when the shear rate of the liquid is below the threshold value, little or no shear thickening will be produced. In the event that the liquid, at the time its threshold value is exceeded, does not develop sufficient shear thickening to be effective, it will be understood that another and more suitable liquid will be selected which develops the required shear thickening. In this connection, a liquid may be chosen whose threshold shear rate may vary widely, for example from 5 or 10 to 1000 or 2000 or more reciprocal seconds, it being understood that these are merely illustrative values; and it is also to be understood that values of the viscous resistance developed are sufficient for the applications herein contemplated.

It is further to be understood that the liquids contemplated herein exhibit order-of-magnitude changes in viscosity, i.e., changes of at least twofold, for small changes in shear rate.

When the device is at rest, liquid may flow out of the gaps and in such event is caught in reservoirs 36 and 37 and may be reused.

It may be noted that the use of a parallel plate structure at both ends of the system not only provides sealing action but also confers a dynamic axial stability. In the structure shown, should the rotatable plates be displaced by axial movement of the shaft so that the gap spacings are no longer equal, then it may be noted that the shear rate will increase in the smaller gap and decrease in the larger. As normal force or normal stress is a function of shear rate, the normal stress at the smaller gap will be greater than at the larger gap and thus act to return the shaft to a position in which the gaps are equal.

The invention is generally applicable to any lubricated structure having a rotatable part such as a rotatable shaft or bearing or housing and the like, being particularly suitable for journal bearings.

The terms "outer" or "outwardly," as used in connection with points disposed radially of the plates, refer to points disposed toward the periphery of the plates, while "inner" or "inwardly" refers to points disposed toward the axis of rotation of the plates. When used to refer to points located axially of the shaft, "outer" or "outwardly" refers to points disposed away from the transverse center or midpoint of the shaft, while "inner" or "inwardly" refer to points disposed toward such transverse center.

The term "liquid" means all fluid-like materials other than gases, and includes liquid-like materials or systems.

It will be understood that the invention is capable of obvious variations without departing from its scope.

In the light of the foregoing description, the following is claimed.

1. In a device comprising a lubricated rotatable shaft supported by a bearing wherein lubricant tends to escape, the improvement comprising lubricant sealing means in the form of: a parallel plate arrangement at each end of the shaft, each such arrangement comprising a rotatable plate and a fixed plate with a gap therebetween, a shear-thickening viscoelastic liquid in each said gap, a bore in the shaft which opens in each said gap and through which liquid may flow, a plurality of passages extending from the bore to outer cylindrical surfaces of the shaft, a lubricant on said outer shaft surfaces, rotation of the rotatable plate serving to subject the liquid in each said gap to tangential shear which in turn generates normal stresses in the liquid which force liquid into said bore and passages, said liquid in shear, by virtue of the shear-thickening action thereof, forming a seal in peripheral portions of each said gap, said seal comprising thickened liquid in said gaps which acts to prevent leakage of liquid outwardly of said peripheral portions.

2. The device of claim 1 wherein the plates of each said arrangement are coaxially disposed, are substantially parallel, and have adjacent surfaces that are substantially flat.

3. The device of claim 2 wherein said plates are substantially circular.

4. The device of claim 1 wherein one of said plates has a peripheral flange portion which extends toward the other plate.

5. The device of claim 1 wherein said lubricant and liquid are separate materials, said liquid being compatible with the lubricant.

6. The device of claim 1 wherein said lubricant and liquid are one and the same material.

7. The device of claim 1 wherein a reservoir is disposed below and adjacent the periphery of both plates.

8. The device of claim 1 wherein inlet means are provided in the parallel plate arrangement at one end of the shaft for introducing liquid to the gap thereof, wherein unthickened liquid in said gap is continuously fed through said bore and passages and over said shaft surfaces, and wherein outlet means are provided in the parallel plate arrangement at the other end of the shaft for removing liquid from the gap thereof.

9. Device of claim 8 wherein said seal formed in the first-mentioned gap acts to close off said inlet means, and wherein a valve is disposed in said outlet means for closing off the latter, thereby preventing the continuous feed of liquid through said bore and passages.

10. A device of claim 8 wherein the seals formed in said gaps act to close off said inlet and outlet means, thereby preventing the continuous feed of liquid through said bore and passages.

11. In a device comprising a lubricated rotatable shaft supported by a bearing wherein lubricant tends to escape axially of the shaft, the improvement comprising lubricant sealing means in the form of: a plate fixed to the shaft at both ends of the bearing, said plates being rotatable with the shaft, a fixed plate disposed outwardly of each rotatable plate and spaced therefrom by a narrow gap, a shear-thickening viscoelastic liquid in each said gap which also functions as said lubricant, a bore in the shaft which opens in each said gap and through which liquid may flow, a plurality of radially arranged passages extending radially from the bore to outer cylindrical surfaces of the shaft and serving to transfer said liquid from the bore to said outer surfaces to lubricate the shaft, rotation of the shaft and rotatable plates serving to subject the liquid in said gaps to tangential shear which in turn generates normal stresses in the liquid by means of which the liquid flows in said bore and passages, and said liquid in shear, by virtue of the shear-thickening effect thereof, forming a seal in peripheral portions of each said gap, said seal comprising the thickened liquid in said gaps which acts to prevent leakage of liquid outwardly of said peripheral portions.

References Cited

UNITED STATES PATENTS

| | | | |
|---|---|---|---|
| 862,117 | 7/1907 | Smith | 308—36.3 |
| 2,463,890 | 3/1949 | Lundquist | 277—13 X |
| 2,485,537 | 10/1949 | Rae | 277—13 |
| 2,533,199 | 12/1950 | Roberson | 277—13 |
| 2,711,332 | 6/1955 | Audemar | 277—13 |
| 2,738,208 | 3/1956 | Mylander | 277—13 |
| 2,834,618 | 5/1958 | Wiltse | 277—14 |
| 2,710,205 | 6/1955 | Brkich | 308—36.3 X |
| 3,004,782 | 10/1961 | Meermans | 277—67 X |

FOREIGN PATENTS

| | | |
|---|---|---|
| 315,789 | 6/1930 | Great Britain. |

MARTIN P. SCHWADRON, *Primary Examiner.*

L. L. JOHNSON, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,401,990            September 17, 1968

Joseph G. Savins

It is certified that error appears in the above identified patent and that said Letters Patent are hereby corrected as shown below:

Column 3, line 51, "characteristics" should read -- characteristic --; line 52, cancel "more passages 15 and bores 14 and 22. From gap 24 the". Column 6, line 31, "A device" should read -- Device --.

Signed and sealed this 10th day of February 1970.

(SEAL)
Attest:

Edward M. Fletcher, Jr.          WILLIAM E. SCHUYLER, JR.
Attesting Officer               Commissioner of Patents